US007809101B2

(12) United States Patent
Frutschy et al.

(10) Patent No.: US 7,809,101 B2
(45) Date of Patent: Oct. 5, 2010

(54) MODULAR MULTISPOT X-RAY SOURCE AND METHOD OF MAKING SAME

(75) Inventors: Kristopher John Frutschy, Clifton Park, NY (US); Yang Cao, Niskayuna, NY (US); Dennis M. Jacobs, Gloversville, NY (US); Mark E. Vermilyea, Niskayuna, NY (US); Xi Zhang, Ballston Lake, NY (US); Yun Zou, Clifton Park, NY (US); Louis Paul Inzinna, Scotia, NY (US); Michael Hebert, Franklin, WI (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/134,330

(22) Filed: Jun. 6, 2008

(65) Prior Publication Data

US 2009/0304158 A1 Dec. 10, 2009

(51) Int. Cl.

| | |
|---|---|
| ***G01N 23/083*** | (2006.01) |
| ***H05G 1/02*** | (2006.01) |
| ***H01J 35/02*** | (2006.01) |
| ***H01J 35/06*** | (2006.01) |
| ***H01J 35/08*** | (2006.01) |

(52) U.S. Cl. .......................... 378/9; 378/124; 378/134; 378/141

(58) Field of Classification Search .................... 378/4, 378/9, 16, 92, 119, 121, 124, 134, 136, 141; 250/493.1, 494.1, 506.1, 507.1
See application file for complete search history.

(56) References Cited

U.S. PATENT DOCUMENTS

| | | | | |
|---|---|---|---|---|
| 2,720,607 | A | 10/1955 | Criscuolo et al. | |
| 2,764,706 | A | 9/1956 | Atlee | |
| 3,267,315 | A * | 8/1966 | Hofmann | 378/64 |
| 3,752,990 | A | 8/1973 | Fischer | |
| 3,753,020 | A | 8/1973 | Zingaro | |
| 4,135,095 | A | 1/1979 | Watanabe | |
| 4,289,969 | A * | 9/1981 | Cooperstein et al. | 378/9 |
| 4,352,021 | A | 9/1982 | Boyd et al. | |
| 4,418,421 | A * | 11/1983 | Kitadate et al. | 378/199 |
| 4,866,745 | A | 9/1989 | Akai | |
| 5,065,419 | A | 11/1991 | Leguen et al. | |
| 5,631,944 | A | 5/1997 | Kimura et al. | |
| 6,229,870 | B1 | 5/2001 | Morgan | |

(Continued)

OTHER PUBLICATIONS

NDT Supply.com, Inc. Glossary of NDT Terms, Shawnee Mission, KS, www.ndtsupply.com, pp. 1-124.
"Platinum Metals Review", Volume, No. 3, pp. 1-35, Jul. 1957.

*Primary Examiner*—Edward J Glick
*Assistant Examiner*—Anastasia Midkiff
(74) *Attorney, Agent, or Firm*—Jason K. Klindtworth

(57) ABSTRACT

A modular x-ray source for an imaging system includes an electron source mounting plate, two or more electron sources each mounted on and electrically coupled to the electron source mounting plate, and a target block positioned proximately to the two or more electron sources. The source includes two or more targets mounted on and electrically coupled to the target block, each target positioned opposite a respective one of the two or more electron sources to receive a respective beam of electrons therefrom.

21 Claims, 4 Drawing Sheets

U.S. PATENT DOCUMENTS 6,876,724 B2 4/2005 Zhou et al.
7,072,436 B2 7/2006 Pelc
7,145,981 B2 * 12/2006 Pelc .............................. 378/9
7,218,700 B2 * 5/2007 Huber et al. .................. 378/10
7,220,971 B1 5/2007 Chang et al.
7,305,063 B2 12/2007 Heuscher
2005/0002491 A1 1/2005 Lenz
2006/0002515 A1 * 1/2006 Huber et al. ................ 378/137
2006/0078088 A1 * 4/2006 Tang .......................... 378/118
2007/0172023 A1 7/2007 Morton et al.
2007/0258562 A1 11/2007 Dinca et al.
2009/0136001 A1 * 5/2009 DeSalvo et al. ............. 378/124

* cited by examiner

MODULAR MULTISPOT X-RAY SOURCE AND METHOD OF MAKING SAME

BACKGROUND OF THE INVENTION

The invention relates generally to diagnostic imaging and, more particularly, to a modular multispot x-ray source for use in an imaging system and a method of making same.

Traditional x-ray imaging systems include an x-ray source and a detector array. X-rays are generated by the x-ray source, passed through and attenuated by an object, and are detected by the detector array. Hereinafter, the terms "subject" and "object" shall include anything capable of being imaged. The intensity of the attenuated beam radiation received at the detector array is typically dependent upon the attenuation of the x-ray beam by the object. Each detector element of the detector array produces a separate electrical signal indicative of the attenuated beam received by each detector element. The electrical signals are transmitted to a data processing system for analysis which ultimately produces an image.

Generally, as in a CT application, the x-ray source and the detector array are mounted on a gantry and rotated about an imaging plane and around the object. X-ray sources typically include x-ray tubes, which emit the x-ray beam at a focal point. X-ray detectors typically include a collimator for collimating x-ray beams received at the detector, a scintillator adjacent the collimator for converting x-rays to light energy, and photodiodes for receiving the light energy from the adjacent scintillator and producing electrical signals therefrom. The X-ray detectors may also include a direct conversion device for discriminating the energy content of the x-ray beam. The outputs of the detector array are then transmitted to the data processing system for image reconstruction. Electrical signals generated by the detector array are conditioned to reconstruct an x-ray image of the object.

In CT imaging systems, the gantry rotates at various speeds in order to create a 360° image of the object. The gantry contains an x-ray source having an electron source or cathode assembly that generates electrons that are accelerated across a vacuum gap to a target or anode assembly via a high voltage potential. In releasing the electrons, a filament contained within the electron source is heated to incandescence by passing an electric current therethrough. The electrons are accelerated by the high voltage potential and impinge upon a target surface of the target at a focal spot. Upon impingement, the electrons are rapidly decelerated and, in the process, x-rays are generated therefrom.

The process of deceleration typically results in heating of the focal spot to very high temperatures. Thus, X-ray tubes include a rotating target or anode structure for the purpose of distributing heat generated at the focal spot. The target is typically rotated by an induction motor having a cylindrical rotor built into a cantilevered axle that supports a disc-shaped target and an iron stator structure with copper windings that surrounds an elongated neck of the x-ray tube. The rotor of the rotating target is driven by the stator. Because of the high temperatures generated when the electron beam strikes the target, the target is typically rotated at high rotational speed.

Newer generation x-ray tubes have increasing demands for providing higher peak power, thus generally higher average power as well. Higher peak power, though, would result in higher peak temperatures occurring in the target, particularly at the "track" or the point of impact on the target, unless the target design is altered. Because x-ray tubes are typically designed having peak temperatures at limits imposed by material capabilities and high voltage considerations, higher peak power typically calls for a redesign of the target. For a rotating target, the redesign may include higher rotation speed, larger track radius, or novel x-ray production means. These designs will often pose risks of reduced life and reliability. For stationary target sources, the redesign options are limited to material improvements or novel approaches to backscattered electron energy management.

Furthermore, newer generation CT systems have increased gantry speed requirements to better enable, for instance, cardiac imaging. Thus, systems have been designed having applications wherein the gantry is spun at or below 0.5 seconds rotational speed. Such applications may include yet faster gantry rotation, thereby increasing the g-load demands to, for instance, 0.2 second rotation, which represents a g-load well in excess of what can be withstood in current CT systems.

Accordingly, to counter the need for high g-load capability x-ray sources, multispot systems have been designed having stationary imaging components therein. For instance, scanning electron beam (e-beam) x-ray sources include an electron gun positioned at a gantry center that emits an e-beam that is magnetically deflected toward a target. In such a system, the target typically forms a continuous ring surrounding a patient, and the e-beam is rapidly deflected to circumferential locations on the target and around the patient. The e-beam may be deflected in the z-direction as well. As such, multispot imaging may be performed very rapidly using stationary components. However, not only are such systems expensive, they may be prone to performance degradation as well. For instance, the continuous target may have thermal distortion that can degrade image quality through excessive focal spot motion.

Furthermore, other known systems having stationary components include a thin transmission-style target for x-ray generation. However, such a continuous target is likewise prone to thermal loading and distortion effects resulting, as well, in degraded image quality through excessive focal spot motion.

Therefore, it would be desirable to design a cost-effective modular multispot x-ray source having robust g-load capability and improved thermal loading capability.

BRIEF DESCRIPTION OF THE INVENTION

The invention is a directed to an apparatus and method of manufacturing a cost-effective modular multispot x-ray source having robust g-load capability and improved thermal loading capability.

According to one aspect of the invention, a modular x-ray source for an imaging system includes an electron source mounting plate, two or more electron sources each mounted on and electrically coupled to the electron source mounting plate, and a target block positioned proximately to the two or more electron sources. The source includes two or more targets mounted on and electrically coupled to the target block, each target positioned opposite a respective one of the two or more electron sources to receive a respective beam of electrons therefrom.

In accordance with another aspect of the invention, a method of manufacturing a modular x-ray source includes forming an array of electron sources that are configured to each emit a beam of electrons, forming an array of targets, each spaced one from the other in substantially the same pattern as the array of electron sources, and positioning the array of targets proximately to the array of electron sources such that each electron source in the array of electron sources emits electrons to a respective target within the array of targets.

Yet another aspect of the invention includes an x-ray imaging system that includes a rotatable gantry, a detector mounted to the rotatable gantry, and a modular x-ray source mounted to the rotatable gantry. The modular x-ray source includes at least two electron sources mounted on a first plate, at least two targets mounted on a second plate, and two high voltage insulators positioned between the first plate and the second plate. Each electron source is positioned to emit electrons to a respective target.

Various other features and advantages of the invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The operating environment of the invention is described with respect to a sixty-four-slice computed tomography (CT) system. However, it will be appreciated by those skilled in the art that the invention is equally applicable for use with other multi-slice configurations. The invention will be described with respect to a "third generation" CT scanner, but is equally applicable with other CT systems.

Figure 1:
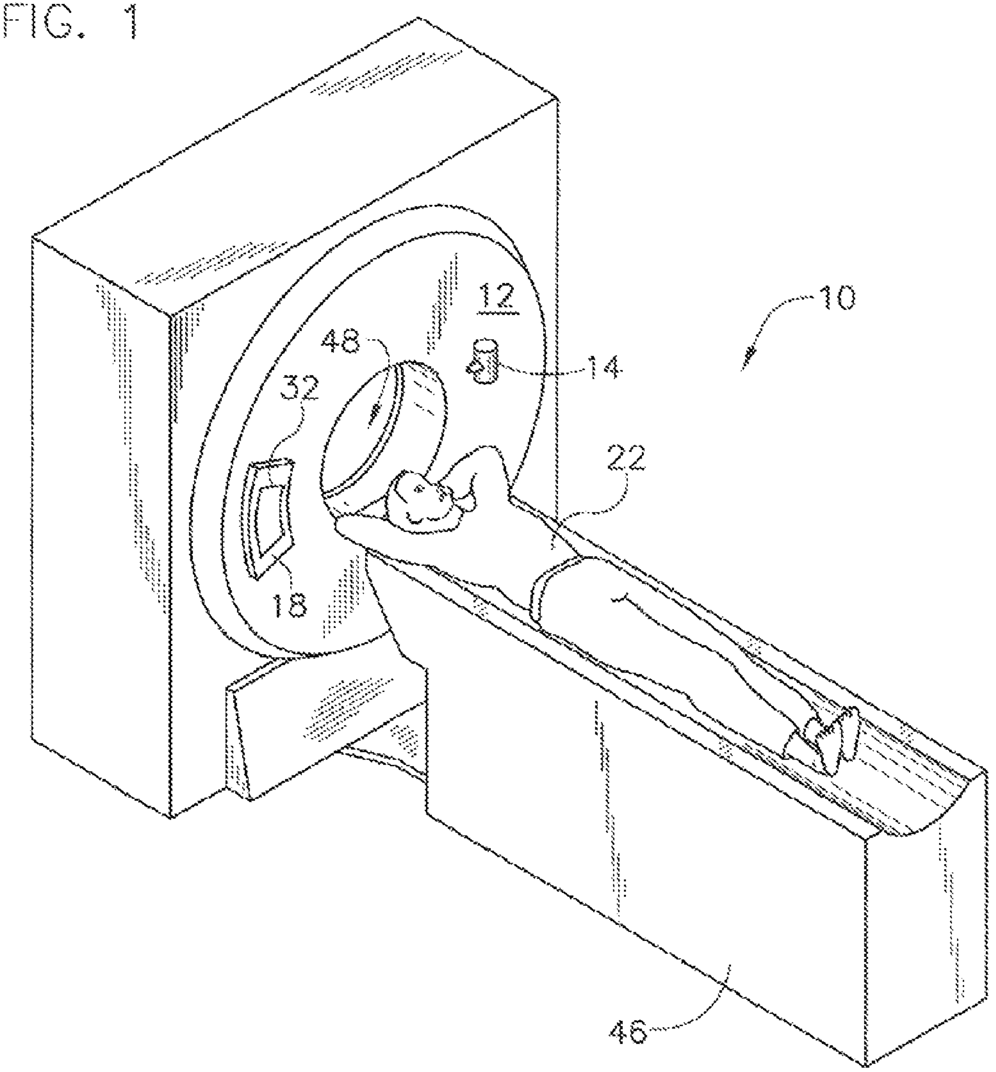
FIG. 1 is a pictorial view of a CT imaging system.
Figure 2:
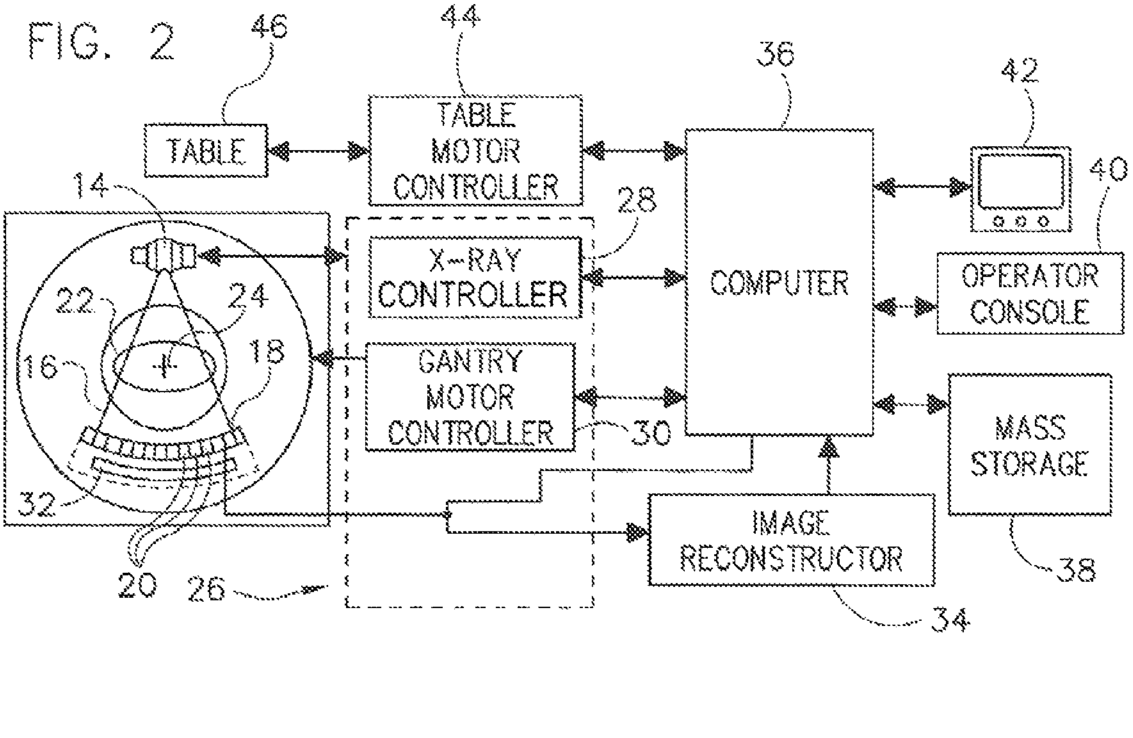
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays toward a detector assembly or collimator 18 on the opposite side of the gantry 12. Referring now to FIG. 2, detector assembly 18 is formed by a plurality of detector elements 20 and a data acquisition system (DAS) 32. The detector elements 20 sense the projected x-rays 16 that pass through an object or medical patient 22, and DAS 32 converts the data to digital signals for subsequent processing. Each detector element 20 produces an analog electrical signal that represents the intensity of an impinging x-ray beam after attenuation by the imaged object 22. During a scan to acquire x-ray projection data, gantry 12 and the components mounted thereon rotate about an axis 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high-speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a controller 44 to position a motorized table 46 and hence patient 22 and gantry 12. Particularly, table 46 moves patients 22 through a gantry opening 48 of FIG. 1 as required to provide an image of the desired volume.

The x-ray source 14 may include a modular design according to an embodiment of the invention. In this embodiment, referring to FIG. 3, a module 100 includes a electron source support or mounting plate 102 and a support, or target or target block 104. The two supports 102, 104 are structurally separated by high-voltage stand-offs, or insulators, 106 and 108. In one embodiment, mounting plate 102 is fabricated of stainless steel or other rigid material, and mounting plate 104 is fabricated of copper or other thermally conductive material. The insulators 106, 108 are fabricated from an electrically insulating material such as alumina or aluminum nitride or other insulating material, and may be mounted to the supports 102, 104 via clamping hardware or bolts, as is understood within the art. The metal shields 105 reduce electrical field concentration and thus flashover risk at the insulator-to-shield-to-vacuum triple point. The metal shields 105 are attached to their respective supports 102, 104, and are also attached to the insulators 106, 108. Thus, the supports 102, 104 are electrically isolated one from the other via the insulators 106, 108 such that the supports 102, 104 may withstand up to 140 kV or more therebetween. A plurality of cathodes or electron sources 110 are mounted on the electron source support plate 102, and a plurality of anodes or targets 112 are mounted on the target block 104. In one embodiment, the target 112 includes a W—Re layer mounted and either bolted or brazed to a TZM structure. In another embodiment, a structure 127 (shown in phantom) is attached to the target block 104 and is attached thereto via, for instance, bolts at positions 125. In one embodiment, structure 127 is fabricated from a high-density material such as tungsten to provide, in additional to structural stiffening of the assembly, x-ray shielding as well.

The electron sources 110 are configured as sub-modules three of which are illustrated 114, 115, 117, and each of which includes, in the illustrated embodiment, four electron sources 110. Each electron source 110 is positioned opposite a respective target 112. The electron source sub-modules 114, 115, 117 are mounted on the electron source mounting plate 102 via electron source support blocks 116. The electron source sub-modules 114, 115, 117 and their respective electron source support blocks 116 may be mounted on additional spacers 118, 119 such as illustrated for electron source sub-modules 114, 115, such that target-electron source spacing may be controlled independently for each electron source sub-module. As illustrated, the spacers 118, 119 are designed to position each electron source 110 within each electron source sub-module 114, 115, 117 at a proper spacing with respect to its respective target 112. Thus, a 4×3 array of 12 target-electron source pairs are illustrated in the module 100.

One skilled in the art will recognize that the module 100 need not be limited to three sub-modules 114, 115, 117, nor does the number of electron sources 110 need to be limited to four within each sub-module 114. As such, a module 100 may include more or less than the 12 pairs illustrated in FIG. 3. In embodiments, electron sources (each having respective targets) are arranged in a two-dimensional matrix pattern having M rows of electron sources and N columns of electron sources, wherein M and N are each greater than or equal to 2. The extent and form factor of this array is governed by the geometry of the desired image volume and the system, as well as mechanical and electrical design considerations.

The targets 112 are positioned within the target block 104 such that electrons are emitted substantially orthogonal therefrom and received from each respective electron source 110 on a focal spot surface at an angle of between 0° and 90°. In a preferred embodiment the angle is between 10° and 40°. Each electron source 112 includes tungsten, molybdenum, and/or alloys thereof including other materials, for generation of x-rays, as is commonly understood within the art. Alternatively, each electron source 112 may include field emitters. The target block 104, with its plurality of targets 112, further includes a target cover 120, positioned on the target block 104 and having a plurality of holes or passageways 122 therein. The passageways 122 are positioned to allow passage of electrons from each electron source 110 to its respective target 112, while limiting the flow of backscattered electrons and ions away from the target to the tube frame and electron source, respectively.

Module 100 is positioned within a vacuum environment in, for instance, a CT gantry. A high voltage, such as a monopolar operation having up to 140 kV or more, is applied between the electron sources 110 and the targets 112 via the electron source plate 102 and the target block 104. In this embodiment, the 140 kV voltage difference is applied by grounding the electron source plate 102 and applying +140 kV to the target block 104. However, one skilled in the art will recognize that the voltage differential may be applied in other fashions, such as by splitting the applied kV between the target block 104 and the electron source plate 102 (i.e. a bipolar operation having +70 kV to the target block 104 and −70 kV to the electron source plate 102) or by grounding the target block 104 while applying a −140 kV bias to the electron source plate 102. The split-potential embodiment may include an additional set of insulators between the target or electron source block and the vacuum chamber and attendant changes in the electrical feedthroughs from the high voltage power supply. In one embodiment, the total applied voltage differential is 450 kV or more for, for instance, a baggage scanner in a security application.

In one embodiment, coolant (such as water, dielectric oil, or glycol, as examples) is flowed through a plurality of coolant lines 124 to remove heat generated at the targets 112. Such coolant lines may be connected via a manifold that may feed several modules, and the coolant lines may be connected to the manifold via, for instance, a vacuum-compatible connector. Accordingly, the coolant lines 124 may further serve as a means to apply a bias voltage to the module 100. Thus, as an example, in such an embodiment the electron source plate 102 may be grounded and the target block 104 may be biased to +140 kV via the cooling lines 124.

Filaments (not shown) within each electron source 110 are caused to emit beams of electrons 128 toward respective targets 112. The beams of electrons 128 emit from the electron source 110 and are accelerated toward and impinge upon the targets 112 while passing through passageways 122. As such, x-rays 126 are generated and are emitted toward an imaging object, such as the object 22 of FIGS. 1 and 2, from a plurality of targets 112. Because of the discrete nature of the targets 112 and the ability to separately cool them via the cooling lines 124, localized and global thermal distortion of the module 100 may be minimized, thus reducing focal spot motion therefrom. Furthermore, according to this embodiment, each electron sources 110 is not limited to emission from a filament, but may also include electron sources such as field emitters (cold emission) and dispenser cathodes (thermionic emission).

The module 100 is thus a single or stand-alone unit that may be fabricated with a vacuum chamber and inserted into, for example, a CT system such as the CT system 10 of FIGS. 1 and 2. Referring now to FIG. 4, a multi-spot source 200 includes a vacuum region 202 having a plurality of modules 100 therein according to an embodiment of the invention. As such, the multi-spot source 200 includes, in the embodiment illustrated, five modules 100, each of which includes an array of 12 target-electron source pairs and may be included in a single vacuum region. Thus, each module 100, as discussed with respect to FIG. 3, emits 12 x-ray beams 126 (three of which are illustrated), for a total of 60 focal spots in the illustrated embodiment.

One skilled in the art will recognize that the each module 100 may house its own vacuum region. In such an embodiment, a plurality of modules 100 may be positioned within a gantry, having the advantage of enabling replacement of individual modules without having to access the vacuum region 202 as discussed above.

Figure 3:
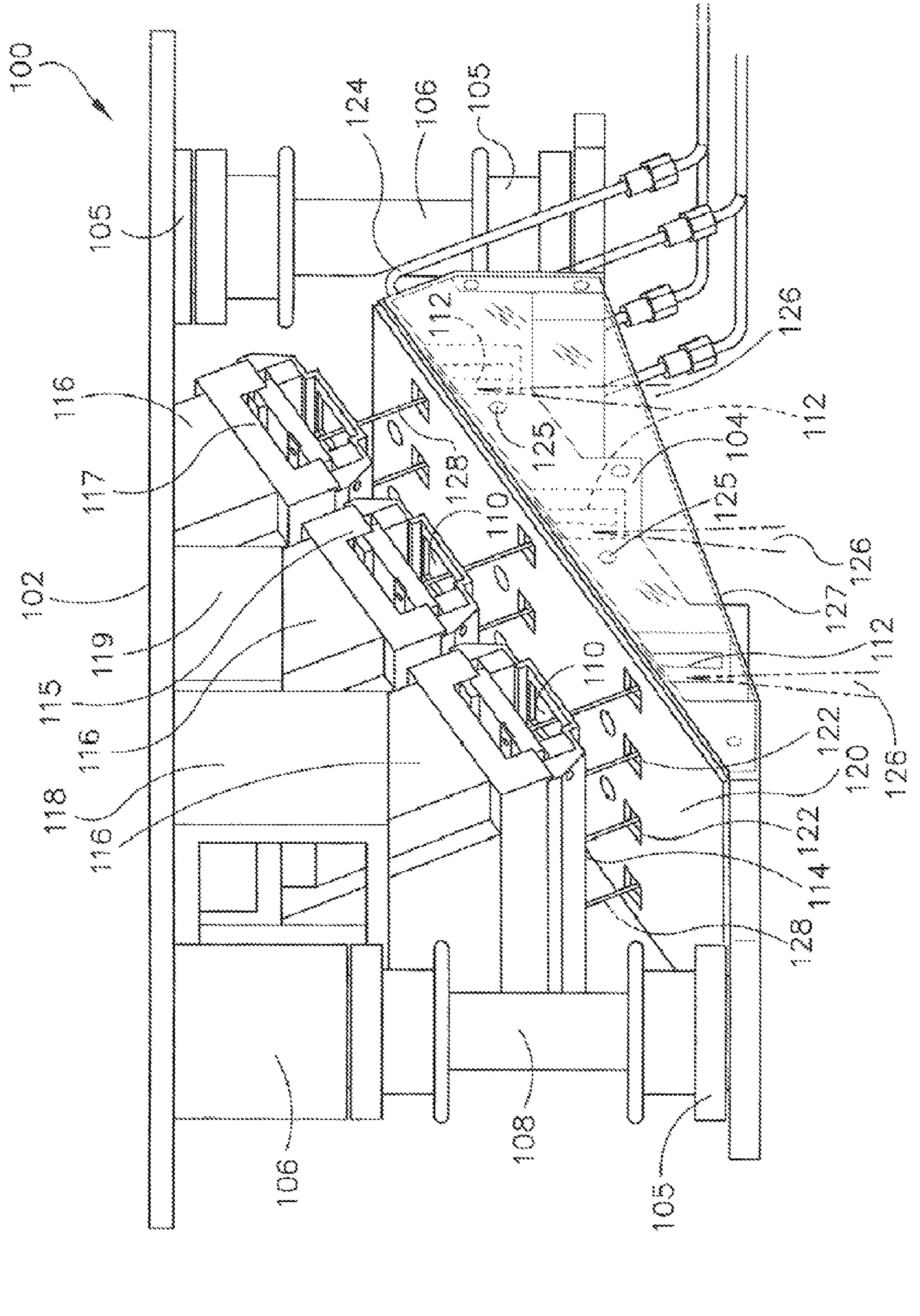
FIG. 3 is a perspective view of a modular multispot x-ray source according to an embodiment of the invention.
Figure 4:
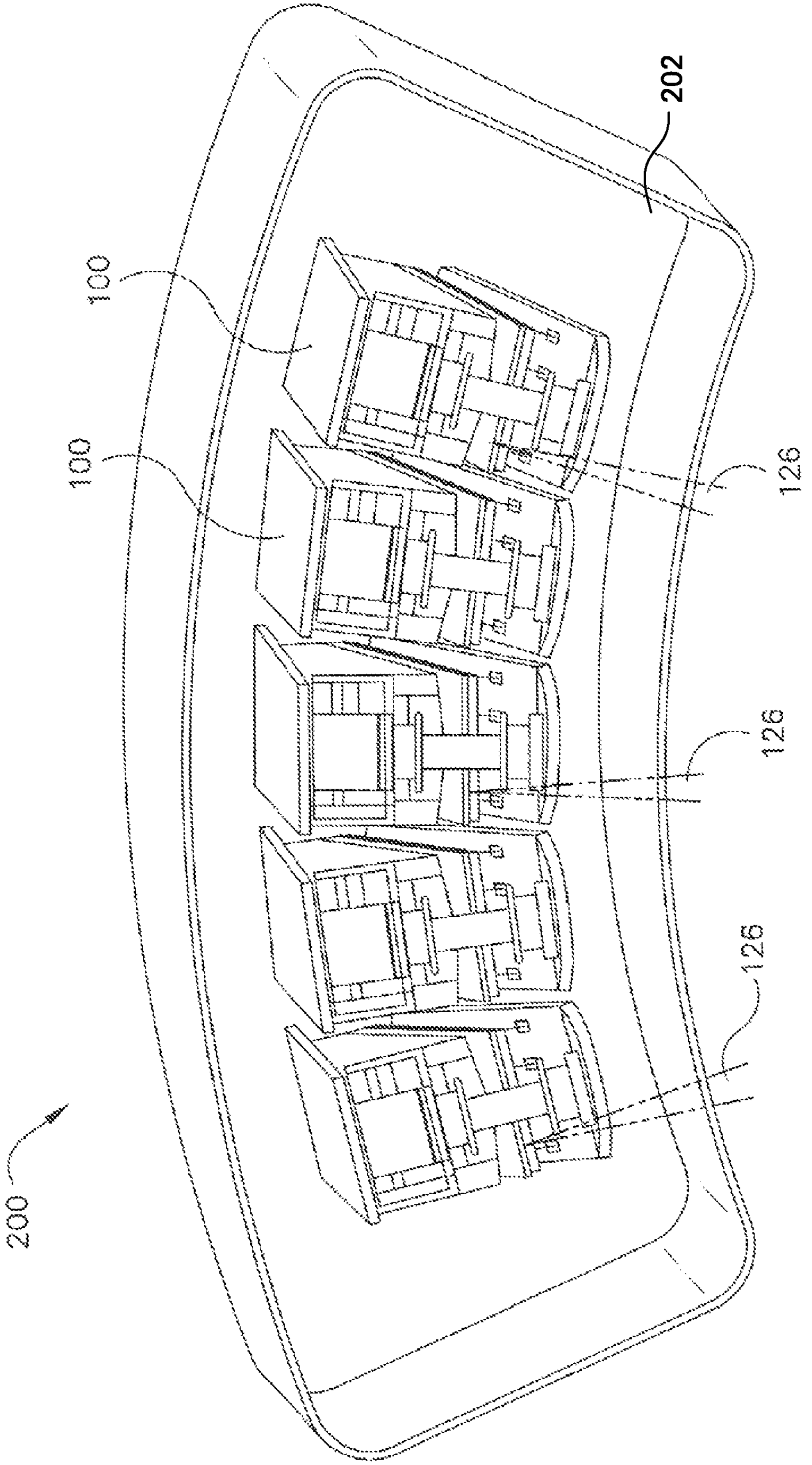
FIG. 4 is a perspective view of a plurality of modular multispot x-ray sources mounted in a portion of a CT gantry, according to an embodiment of the invention.

As discussed with respect to FIG. 3, one skilled in the art will recognize that the number of target-electron source pairs need not be 12 per module. Furthermore, one skilled in the art will recognize that the number of modules 100 need not be five, as illustrated in FIG. 3. Thus, not only may the number of target-electron source pairs be increased or decreased per module, the number of modules may be increased or decreased as well. As such, the number of electron beams 126 designed into the multi-spot source 200 may be selected, based on the requirements of the system.

Furthermore, because of the compact and stand-alone nature of the module 100, the module 100 may be structurally designed to have g-load capability in a system having 0.35 second rotation and faster. Accordingly, the multi-spot source 200 illustrated in FIG. 4 provides a plurality of x-ray sources which may be designed into a system, such as the CT system 10 illustrated in FIGS. 1 and 2. Embodiments of the invention enable a flexible number of focal spots to be designed per module 100 in a design having high g-load capability. Furthermore, a plurality of modules 100 having a minimum amount of thermal distortion therein may be included in the system 10. Embodiments of the invention described above are modular in nature, thus simplifying repair and replacement of individual modules 100 within the system 10.

Figure 5:
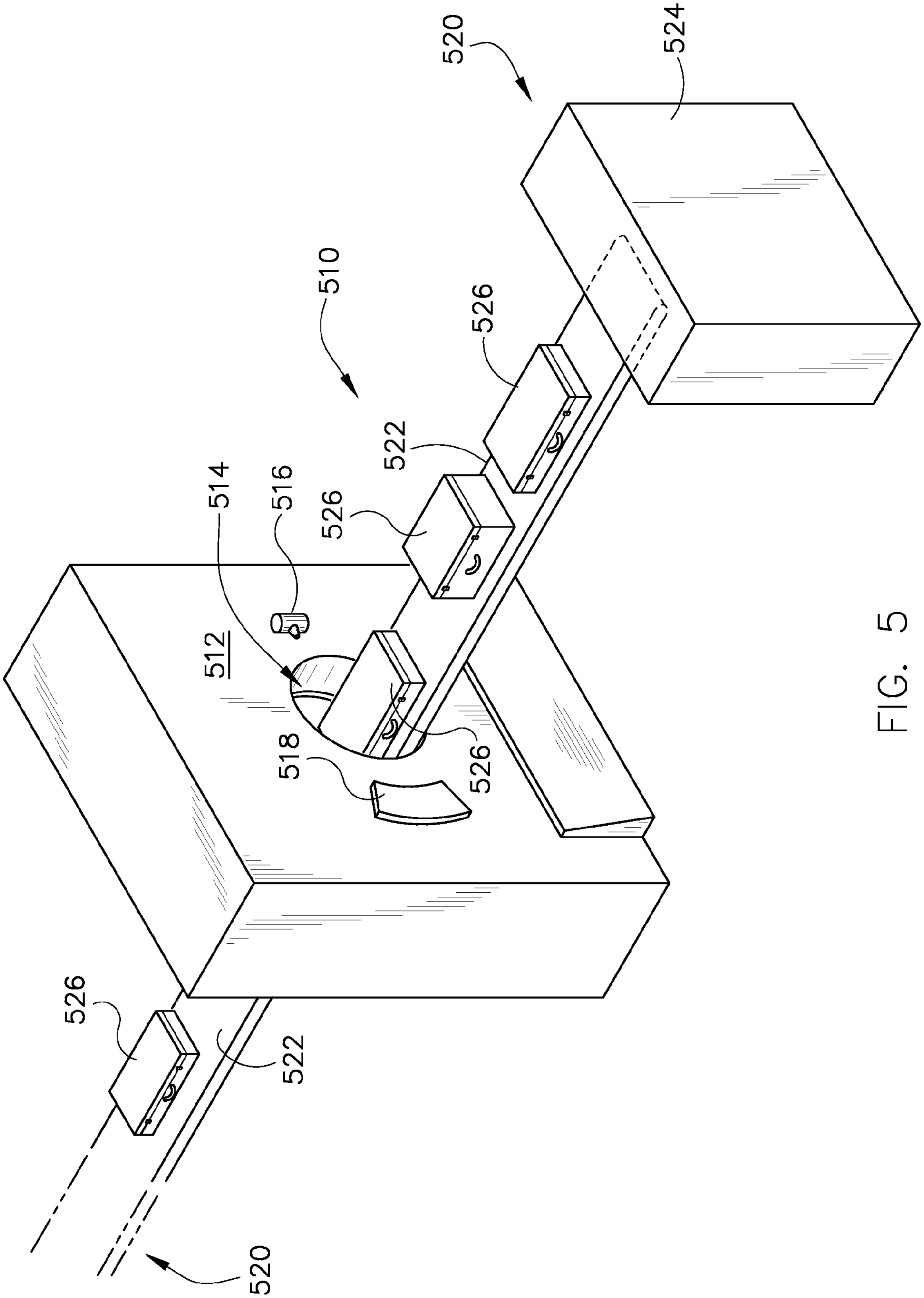
FIG. 5 is a pictorial view of a CT system for use with a non-invasive package inspection system.

Referring now to FIG. 5, package/baggage inspection system 510 includes a rotatable gantry 512 having an opening 514 therein through which packages or pieces of baggage may pass. The rotatable gantry 512 houses an x-ray energy source 516 as well as a detector assembly 518 having scintillator arrays comprised of scintillator cells. A conveyor system 520 is also provided and includes a conveyor belt 522 supported by structure 524 to automatically and continuously pass packages or baggage pieces 526 through opening 514 to be scanned. Objects 526 are fed through opening 514 by conveyor belt 522, imaging data is then acquired, and the conveyor belt 522 removes the packages 526 from opening 514 in a controlled and continuous manner. As a result, postal inspectors, baggage handlers, and other security personnel may non-invasively inspect the contents of packages 526 for explosives, knives, guns, contraband, etc.

A technical contribution for the disclosed method and apparatus is that it provides for a computer implemented diagnostic imaging system having a modular multispot x-ray source for use in an imaging system and a method of making same.

According to one embodiment of the invention a modular x-ray source for an imaging system includes an electron source mounting plate, two or more electron sources each mounted on and electrically coupled to the electron source mounting plate, and a target block positioned proximately to the two or more electron sources. The source includes two or more targets mounted on and electrically coupled to the target block, each target positioned opposite a respective one of the two or more electron sources to receive a respective beam of electrons therefrom.

In accordance with another embodiment of the invention a method of manufacturing a modular x-ray source includes forming an array of electron sources that are configured to each emit a beam of electrons, forming an array of targets, each spaced one from the other in substantially the same pattern as the array of electron sources, and positioning the array of targets proximately to the array of electron sources such that each electron source in the array of electron sources emits electrons to a respective target within the array of targets.

Yet another embodiment of the invention includes an x-ray imaging system that includes a rotatable gantry, a detector mounted to the rotatable gantry, and a modular x-ray source mounted to the rotatable gantry. The modular x-ray source includes at least two electron sources mounted on a first plate, at least two targets mounted on a second plate, and two high voltage insulators positioned between the first plate and the second plate. Each electron source is positioned to emit electrons to a respective target.

The invention has been described in terms of the preferred embodiment, and it is recognized that equivalents, alternatives, and modifications, aside from those expressly stated, are possible and within the scope of the appending claims.

What is claimed is:

1. A modular x-ray source for an imaging system comprising:

an electron source mounting plate;

two or more electron sources each mounted on and electrically coupled to the electron source mounting plate;

a target block positioned proximately to the two or more electron sources;

two or more targets mounted on and electrically coupled to the target block, each target positioned opposite a respective one of the two or more electron sources to receive a respective beam of electrons therefrom, and a coolant line positioned within and electrically coupled to the target block to pass a high-voltage and current applied thereto to the target block, wherein the coolant line is further thermally coupled to the target block to allow heat to be transferred from the target block to a coolant passing therethrough.

2. The modular source of claim 1 further comprising at least one structural support member mechanically coupling the electron source mounting plate to the target block within the modular source.

3. The modular source of claim 2 wherein the at least one structural support member comprises one or more high voltage insulators.

4. The modular source of claim 1 wherein the target block comprises copper.

5. The modular source of claim 1 wherein the electron source mounting plate is grounded.

6. The modular source of claim 1 wherein the target block is grounded.

7. The modular source of claim 1 wherein a negative bias voltage is applied to the electron source mounting plate and a positive bias voltage is applied to the target block.

8. The modular source of claim 1 wherein the angle is between 10° and 40°.

9. The modular source of claim 1 wherein the two or more electron sources are arranged in a two-dimensional matrix pattern having M rows of electron sources and N columns of electron sources, wherein M and N are each greater than or equal to 2.

10. The modular source of claim 1 further comprising a plate attached to the target block having an array of perforations therein such that each beam of electrons emitted from the two or more electron sources to respective targets passes through a perforation in the plate.

11. A method of manufacturing a modular x-ray source comprising:

forming an array of electron sources that are configured to each emit a beam of electrons;

forming an array of targets, each spaced one from the other in substantially the same pattern as the array of electron sources;

mounting the array of targets on a target plate;

positioning the array of targets proximately to the array of electron sources such that each electron source in the array of electron sources emits electrons to a respective target within the array of targets;

positioning cooling lines in the target plate; and applying a high voltage and current flow to the target plate via the cooling lines.

12. The method of claim 11 further comprising grounding the array of electron sources.

13. The method of claim 11 further comprising:

mounting the array of electron sources on an electron source support plate; and positioning one or more high voltage insulators between the electron source support plate and the target plate such that the array of electron sources and the array of targets form a desired target-electron source spacing therebetween.

14. The method of claim 11 wherein the angle is between 10° and 40°.

15. An x-ray imaging system comprising:

a rotatable gantry;

a detector mounted to the rotatable gantry; and a modular x-ray source mounted to the rotatable gantry, the modular x-ray source comprising:

at least two electron sources mounted on a first plate;

at least two targets mounted on a second plate;

a cooling line positioned in the second plate to apply a high-voltage potential to the second plate; and two high voltage insulators positioned between the first plate and the second plate;

wherein each electron source is positioned to emit electrons to a respective target.

16. The x-ray imaging system of claim 15 wherein the second plate comprises copper.

17. The x-ray imaging system of claim 15 wherein the first plate is grounded.

18. The x-ray imaging system of claim 15 wherein the second plate is grounded.

19. The x-ray imaging system of claim 15 wherein the first plate has a negative voltage applied thereto and the second plate has a positive voltage applied thereto.

20. The x-ray imaging system of claim 15 wherein the angle is between 10° and 40°.

21. An x-ray imaging system comprising:

a rotatable gantry;

a detector mounted to the rotatable gantry; and a modular x-ray source mounted to the rotatable gantry, the modular x-ray source comprising:

at least two electron sources mounted on a first plate;

at least two targets mounted on a second plate;

a cooling line coupled to the second plate to apply a high-voltage potential to the second plate; and at least two high voltage insulators positioned between the first plate and the second plate.

* * * * *